Aug. 11, 1925.
R. R. LASSITER
1,549,559
MACHINE FOR TURNING AND THREADING STAY BOLTS
Filed April 28, 1922   11 Sheets-Sheet 8
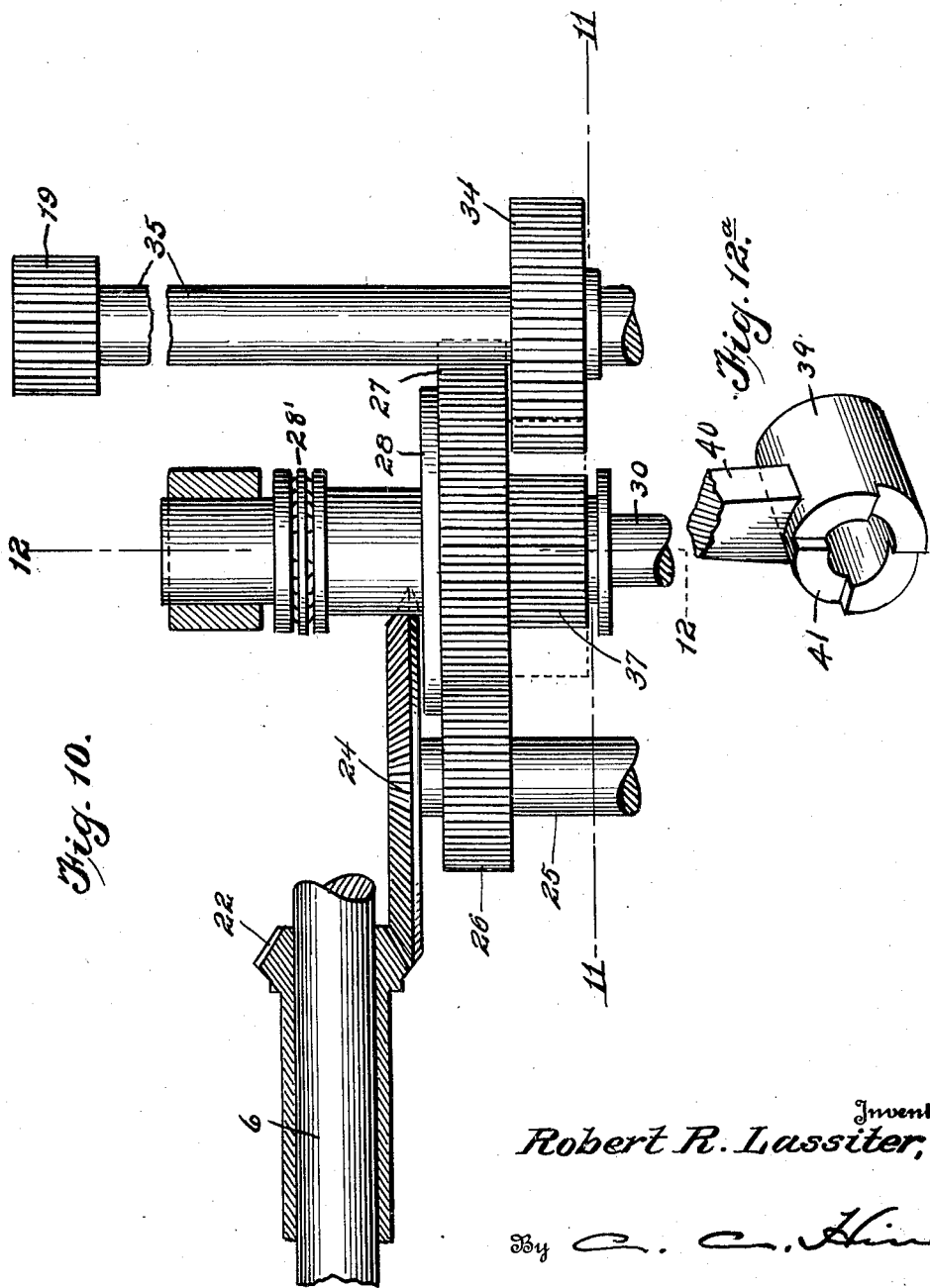
Inventor:
Robert R. Lassiter,
By [signature]
Attorney.

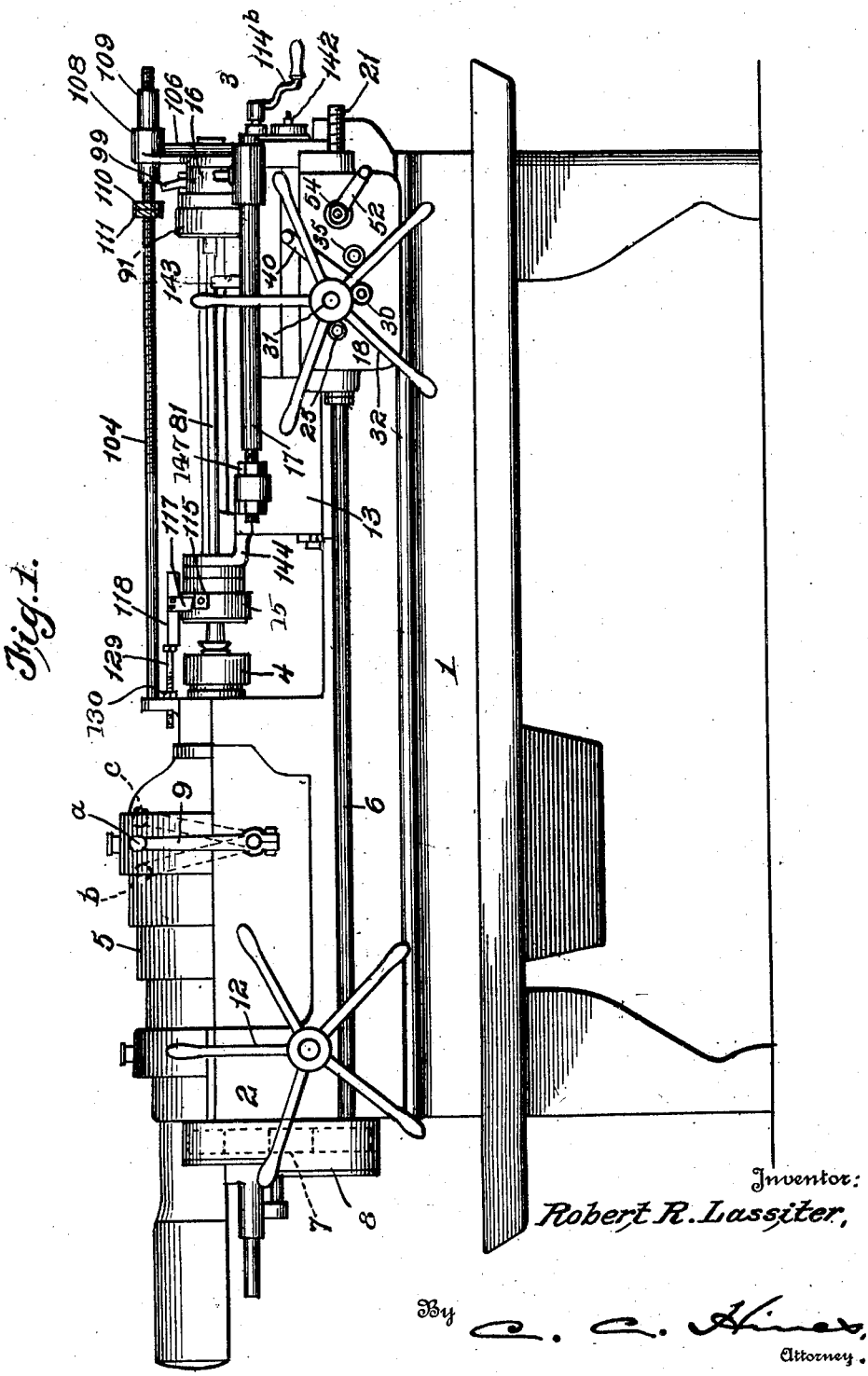

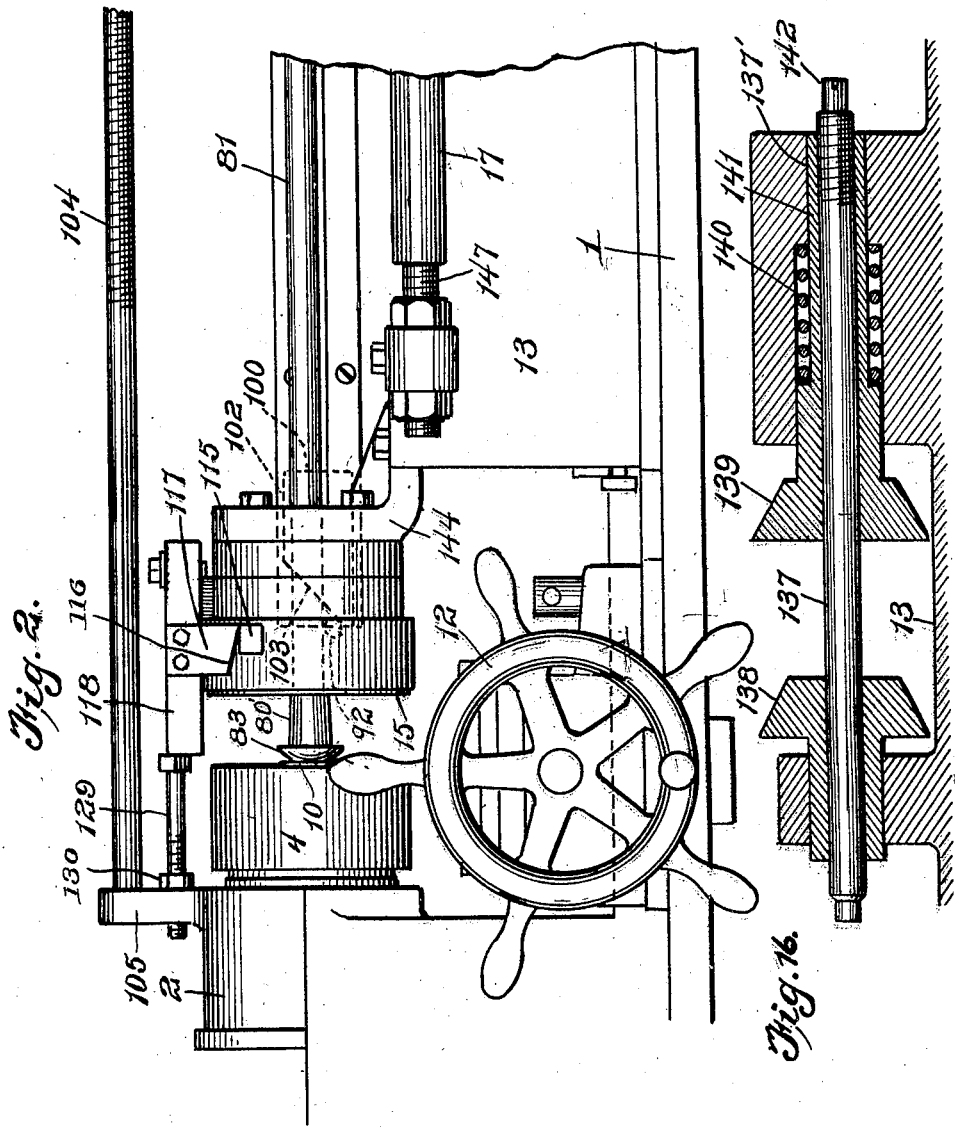

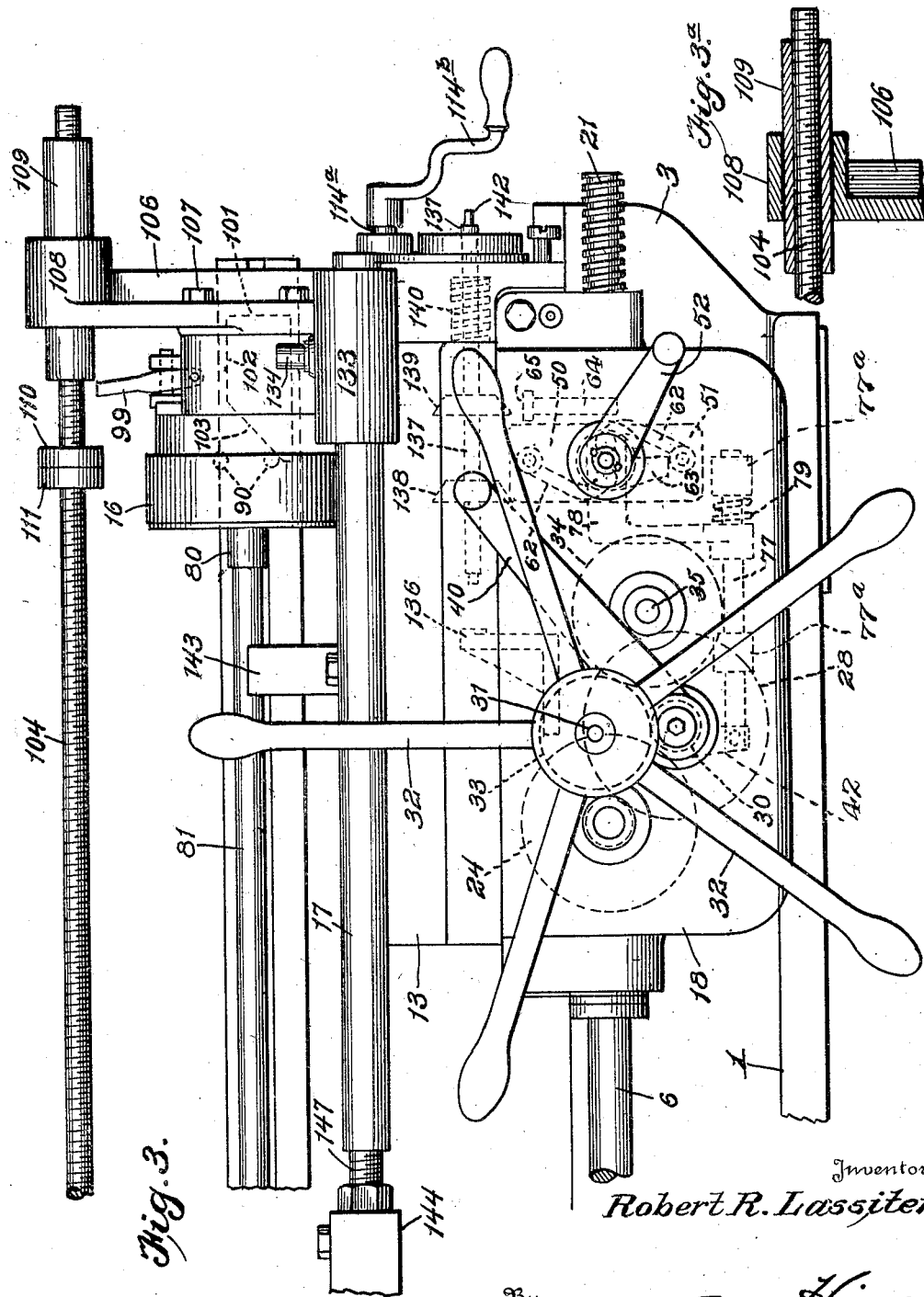

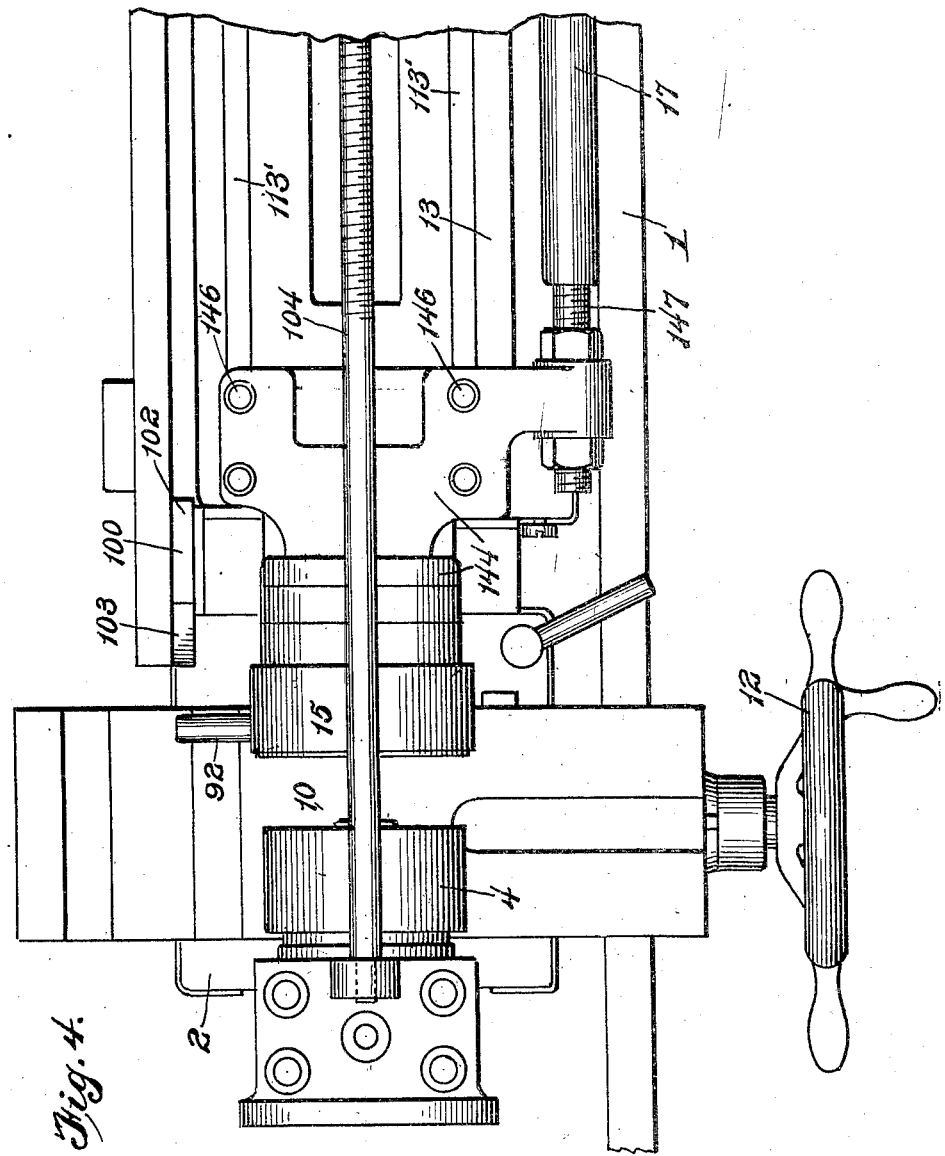

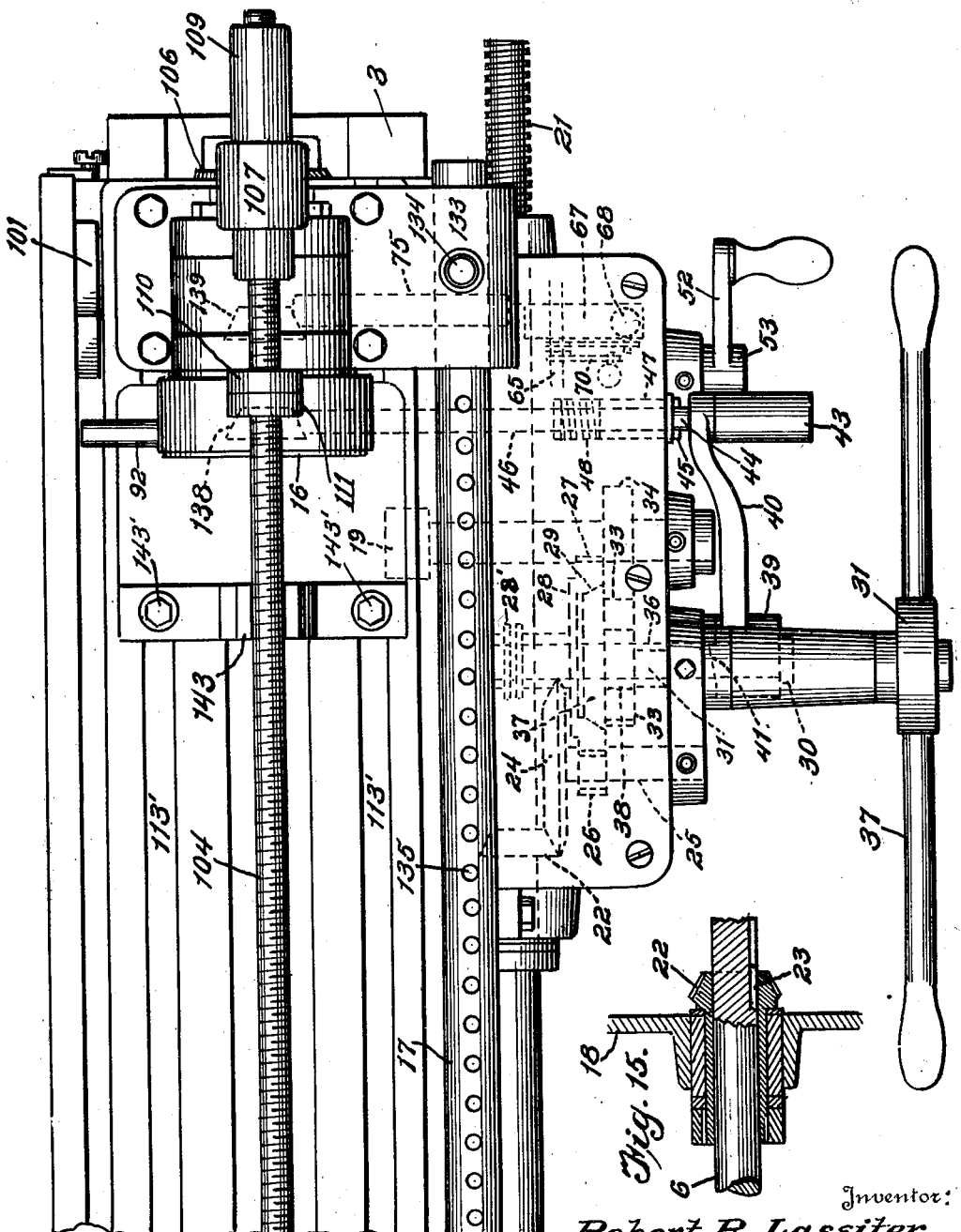

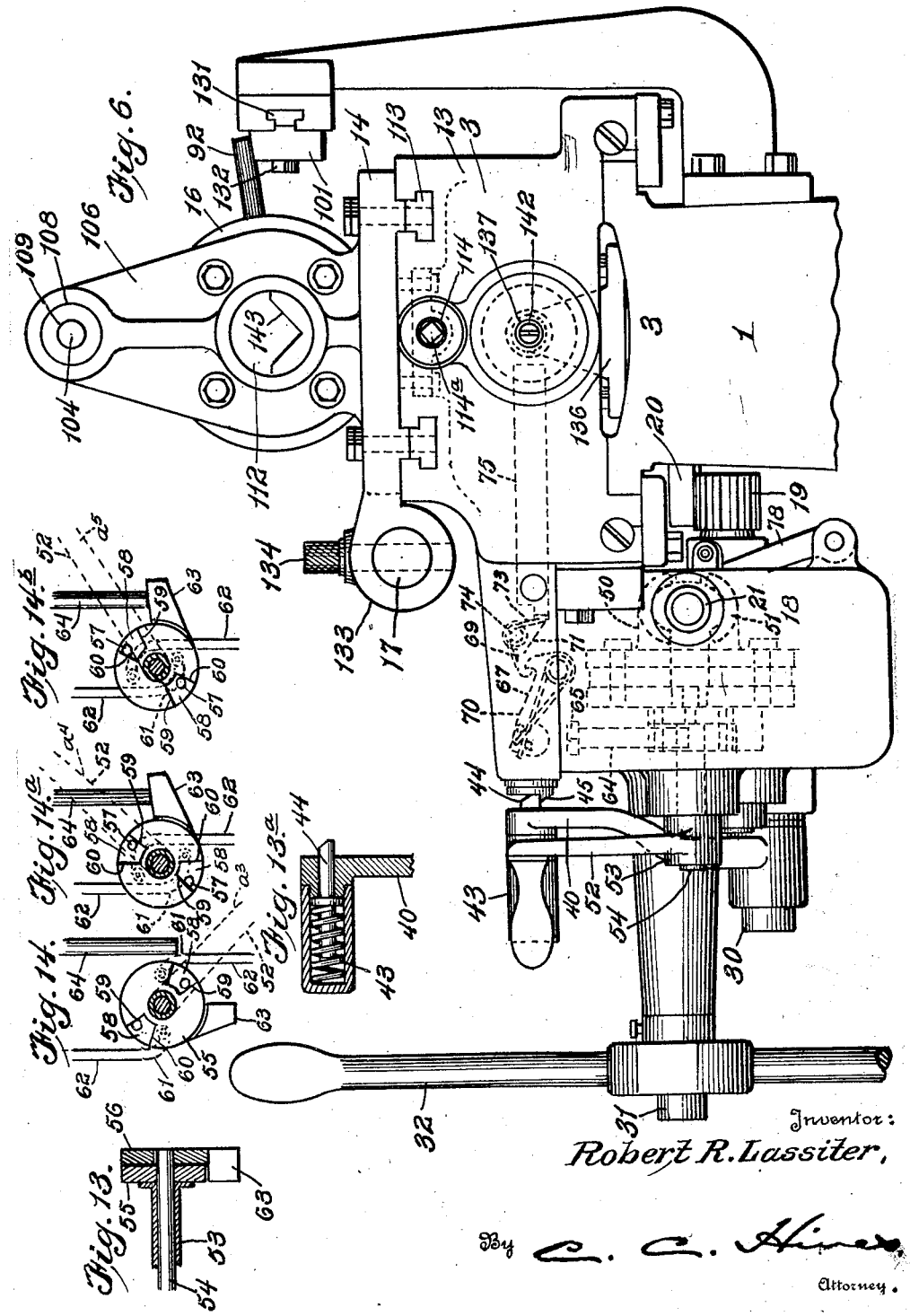

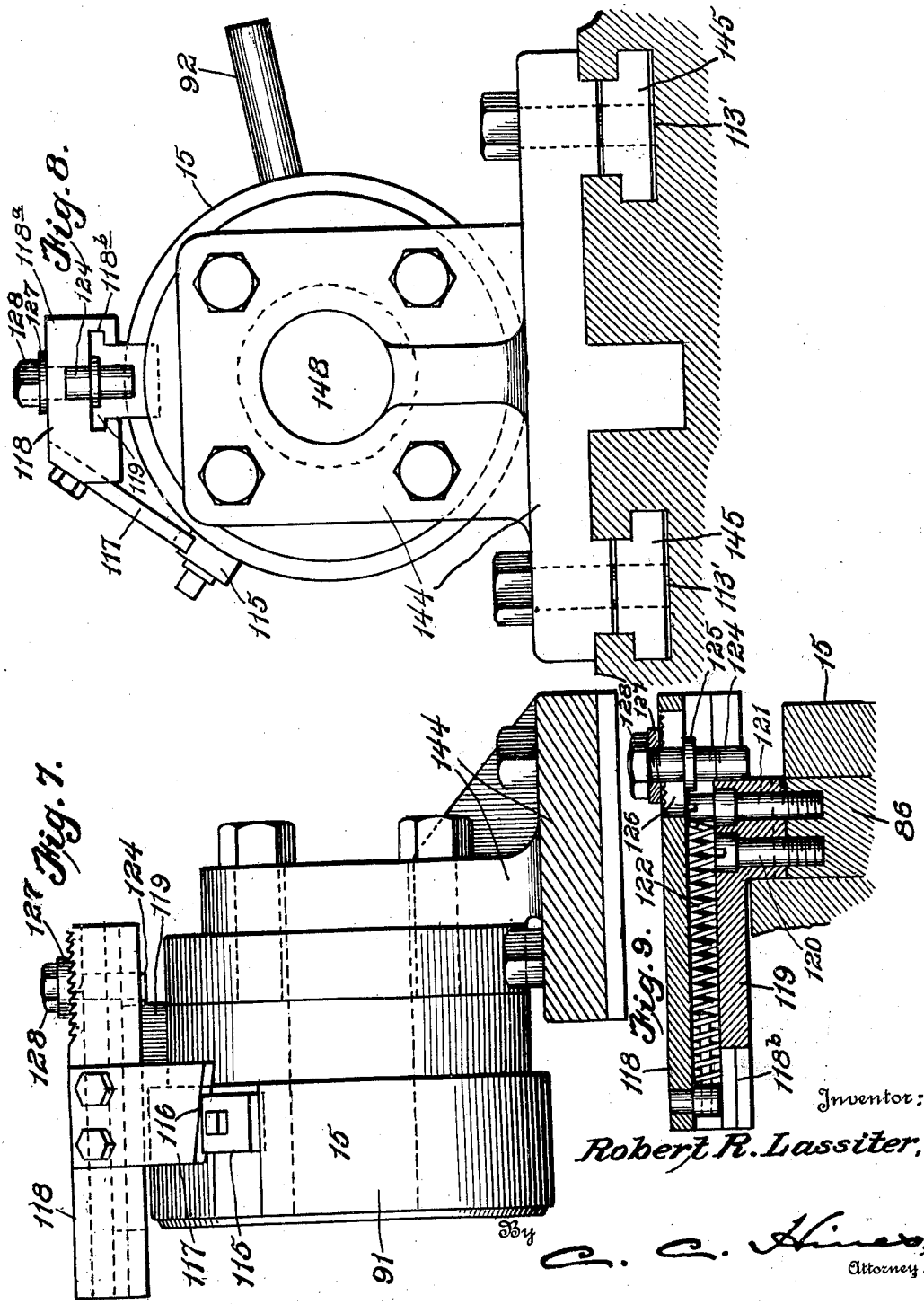

Aug. 11, 1925.   1,549,559
R. R. LASSITER
MACHINE FOR TURNING AND THREADING STAY BOLTS
Filed April 28, 1922   11 Sheets-Sheet 9
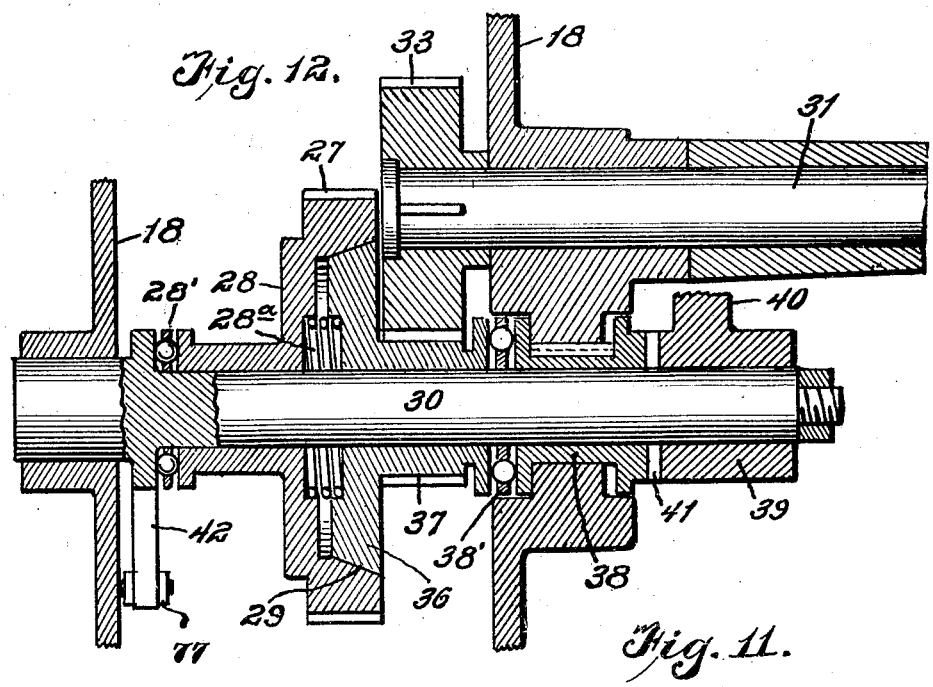
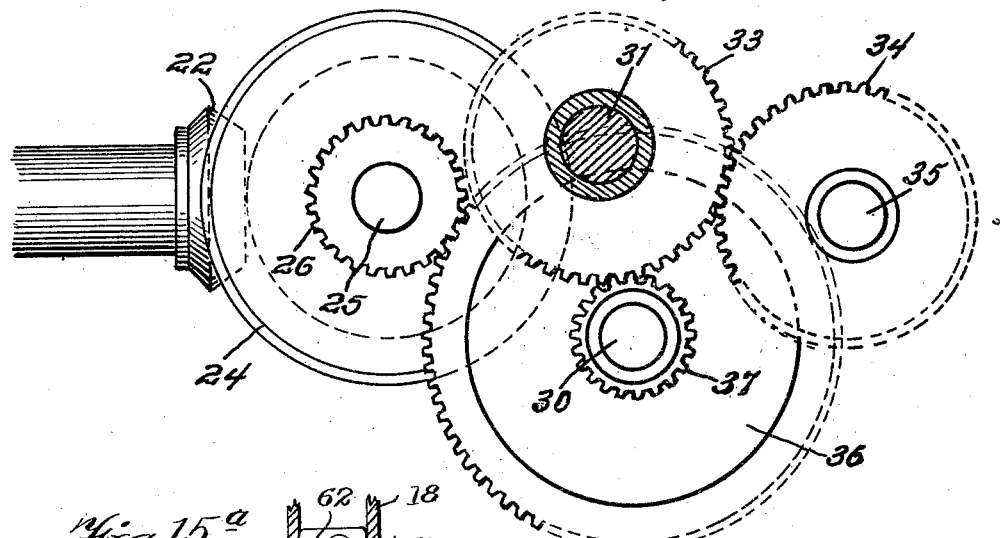
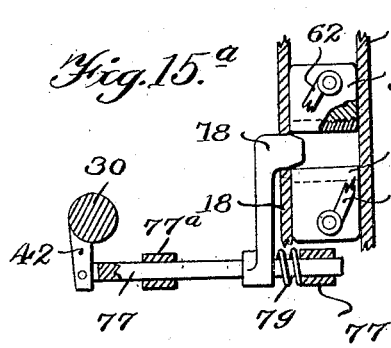
Inventor:
Robert R. Lassiter,
By C. C. Hines,
Attorney.

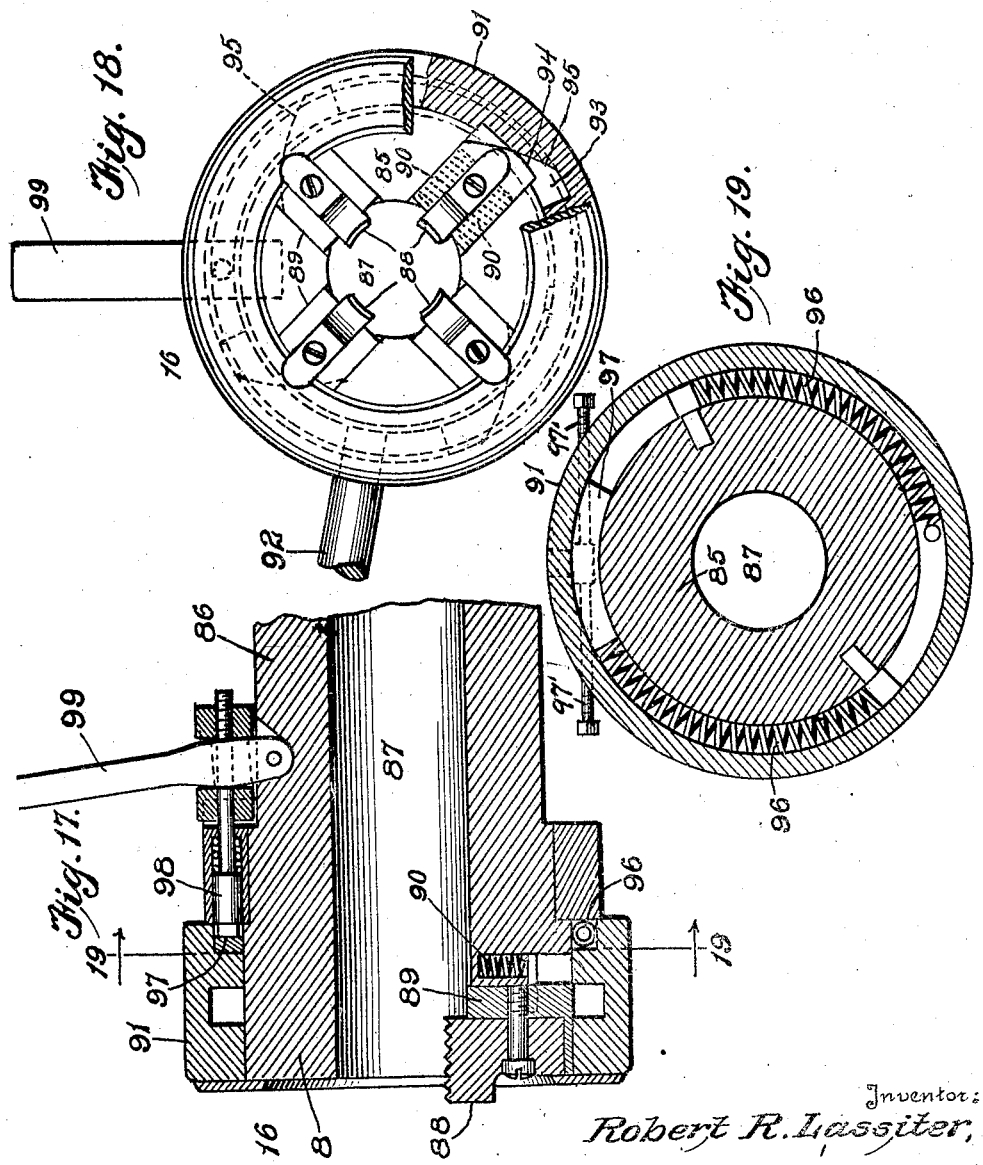

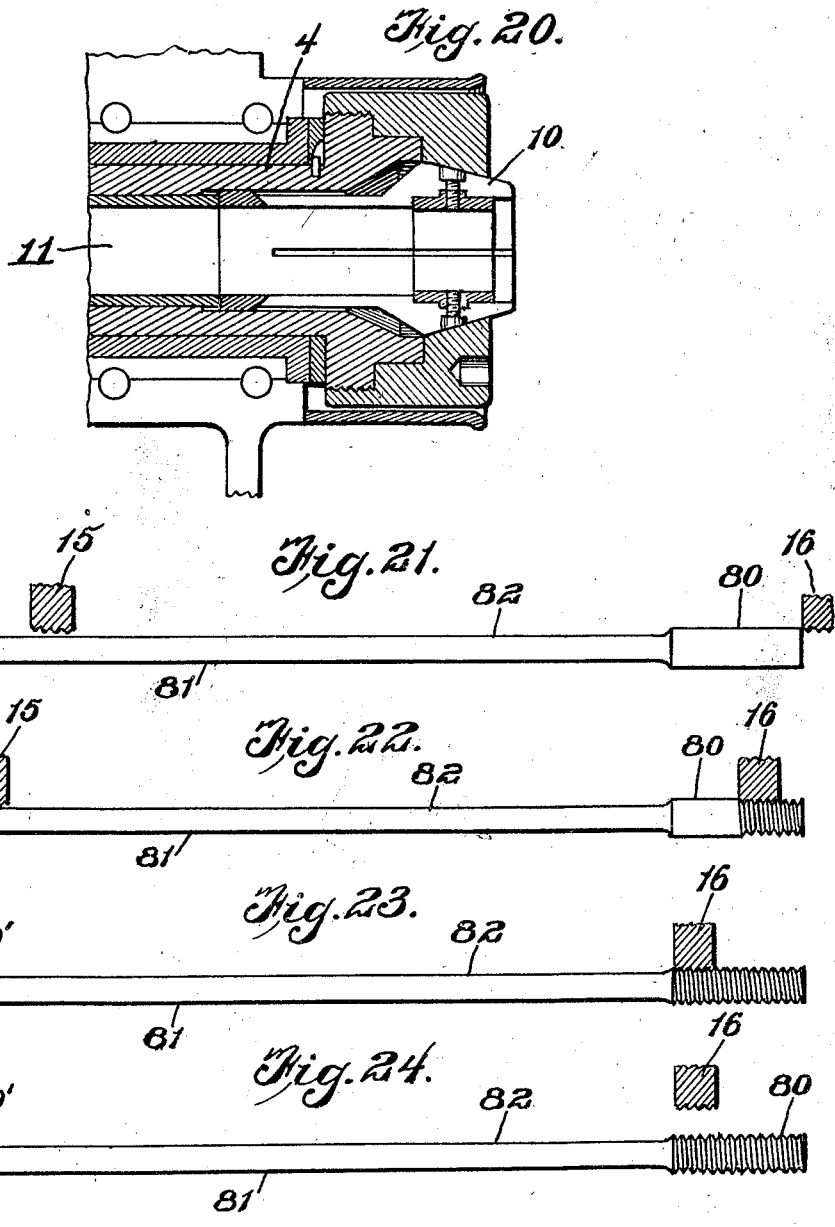

Patented Aug. 11, 1925.

1,549,559

UNITED STATES PATENT OFFICE.

ROBERT R. LASSITER, OF NEW YORK, N. Y., ASSIGNOR TO DALE MACHINERY COMPANY, INC., OF NEW YORK, N. Y., A CORPORATION OF NEW YORK.

MACHINE FOR TURNING AND THREADING STAY BOLTS.

Application filed April 28, 1922. Serial No. 557,045.

*To all whom it may concern:*

Be it known that I, ROBERT R. LASSITER, a citizen of the United States, residing at New York, in the county of New York and State of New York, have invented new and useful Improvements in Machines for Turning and Threading Stay Bolts, of which the following is a specification.

This invention relates to a machine for turning and threading stay-bolts of a type employed in the construction of locomotive and other boilers.

One object of my invention is to provide a machine whereby the ends of a stay-bolt blank may be cut, i. e., turned or threaded, in a simple, reliable, efficient and expeditious manner.

Another object of the invention is to provide a machine whereby stay-bolt blanks of different lengths and of specifically different kinds may be turned or threaded with equal efficiency.

Still another object of the invention is to provide a machine whereby plain taper and "button-head" stay-bolt blanks may be turned or threaded in a convenient, quick and accurate manner.

Still another object of the invention is to provide a machine which simplifies and reduces the number of working parts and working operations required for the production of finished bolts from partially complete blanks, and by means of which accurately turned or threaded bolts may be made with great speed and economy.

With these and other objects in view, which will appear in the course of the subjoined description, the invention consists in the novel construction, combination and arrangement of parts in a machine for carrying the same into practical effect, as will be hereinafter fully described and claimed, reference being had to the accompanying drawings, in which:—

Figure 1 is a view in side elevation of a stay-bolt turning and threading machine constructed in accordance with my invention.

Figure 2 is a similar view, on an enlarged scale, of parts at the head-end of the machine.

Figure 3 is a view similar to Figure 2 of parts at the tail-end of the machine.

Fig. 3ª is a detail section through the supporting means for the rear end of the trip rod.

Figure 4 is a top plan view of the parts shown in Figure 2.

Figure 5 is a top plan view of the parts shown in Figure 3.

Figure 6 is a rear end elevation of the parts shown in Figure 5.

Fig. 7 is an enlarged side elevation of the front cutter-head and the taper-controller governing the opening movement of the cutters thereof.

Figure 8 is a rear end elevation of the parts shown in Figure 7.

Figure 9 is a longitudinal section through the taper-controller.

Figure 10 is a sectional plan view of the fast-feed drive gearing arranged within the carriage apron.

Figure 11 is a vertical section on line 11—11 of Figure 10.

Figure 12 is a vertical transverse section taken substantially on line 12—12 of Figure 10.

Figure 12ª is a detail view of the cam hub of the friction gear controller handle.

Figure 13 is an axial section through the parts of the clutch connection between the nut-controller lever and the hammer-plunger.

Figure 13ª is a horizontal section through the handle of said lever.

Figures 14, 14ª and 14ᵇ are cross-sections of the clutch, showing the parts in their different operative positions.

Figure 15 is a detail section, showing the connection between the primary drive gear and the drive shaft.

Figure 15ª is a sectional elevation shown, the nut sections and the safety device, the finger of the latter appearing in position to prevent the nut sections from being closed.

Figure 16 is a detail section showing the construction of the adjustable stop.

Figure 17 is a longitudinal section through the rear cutter-head.

Figure 18 is a face view thereof, partly in section.

Figure 19 is a transverse section on line 19—19 of Figure 17.

Figure 20 is a longitudinal section through the chuck and spindle.

Figures 21 to 24, inclusive, are diagrammatic views illustrating the steps of the operation upon a bolt-blank, in this instance a button-head taper stay-bolt blank, for the production of a completed bolt.

Referring now more particularly to the drawings, 1 denotes in general the main frame of the machine embodying the headstock 2 and the tailstock 3. The headstock 2 carries a bolt-blank rotating shaft or spindle 4, driven by any suitable type of drive gearing, generally indicated at 5. In practice, I may employ a variable speed drive gearing of the type used in the well-known Millholland turret screw machine, although any other equivalent and suitable type of drive gearing may be employed. The gearing 5, exposed parts only of which are shown, transmits motion to a longitudinally extending main drive shaft 6 through the medium of a train of transmission gears 7 arranged in a gear casing 8. The gearing 7 may be of a type which admits of the use of intermediate change-speed gears in the train whereby the shaft 6 may be driven at any proper speed for operating the tool-driving mechanisms, hereinafter described, at any proper speed for a bolt-turning action or for cutting a thread of any desired pitch. The drive gearing 5 includes as part thereof a controlling lever 9 adjustable to the three positions $a$, $b$ and $c$, the position $a$ being a neutral position in which the shaft 6 is thrown out of action and the positions $b$ and $c$ high and low speed positions, respectively. At the forward end of the spindle 4 is a chuck-collet 10 to receive and grip a projection upon an end of the bolt-blank, as hereinafter described, whereby the bolt-blank is held and rotated for a working action. This collet is adapted to be closed and opened through reverse sliding motions of a collet-control member 11 (Figure 20), actuable, through suitable intervening connections, from a hand-wheel or other suitable control device 12. The parts as thus far described may be similar to those used on the Millholland machine mentioned, or any suitable and equivalent means for the purpose may be employed.

Slidably mounted in suitable guideways on the main frame 1 is a main carriage 13, and similarly mounted on said main carriage 13 is a slide or carriage 14. These carriages respectively support front and rear cutter-heads 15 and 16, and said cutter-heads are adjustably spaced by a gauge bar 17 of a construction hereinafter described. Depending at one side of the frame from the main carriage 13, and rigidly connected thereto for movement therewith, is an apron 18 forming a casing or housing for parts of certain carriage driving mechanisms for imparting feed motions to the carriages from the drive shaft 6. One of these driving mechanisms includes in part a pinion 19 meshing with a rack-bar 20 on the main frame 1, which also forms part of a means whereby the carriages may be manually moved forward and backward for tool positioning operations.

The drive shaft 6, which is suitably journaled on the main frame, has its rear portion extended longitudinally through the apron 18 and threaded, as indicated at 21, to form a lead screw. Journaled to rotate in fixed bearings in the apron, for back and forth travel therewith, is a beveled primary drive gear 22. This gear 22, which is feathered or splined, as indicated at 23 (Figure 15), to slide upon and rotate with the shaft 6, is constantly driven from said shaft and imparts constant drive motion to another beveled gear 24 (see Figures 10, 11 and 12). Gear 24 is fixed to a shaft 25, on which is also fixed a spur pinion 26 meshing with the spur toothed periphery 27 of a gear member 28 having an internal friction surface 29. Gear member 28 is loosely mounted on a rock rod or shaft 30 arranged below a shaft 31, said shaft 31 having fixed thereto a hand wheel 32 and a gear 33, which gear 33 meshes with a gear 34 on a drive shaft 35, which shaft 35 also carries the pinion 19 meshing with the rack-bar 20. On shaft 30 is loosely mounted a friction cone 36 having fixed thereto a gear pinion 37, the latter meshing with the gear 33. One end of the shaft 30 projects outwardly from the apron 18 through a non-rotatable sliding sleeve 38 and has fixed thereon a hub or sleeve 39 on one end of a control lever 40. Between the rear face of gear 28 and an enlarged portion of shaft 30 is an anti-friction thrust bearing 28' and between the adjacent surfaces of pinion 37 (or friction cone 36) and the sleeve 38 is a similar anti-friction thrust bearing 38'. Formed on the sleeves 38 and 39 are cam surfaces 41 whereby, through prescribed movements of the lever 40, the sleeve 38 may be caused to slide inwardly to engage friction cone 36 with friction surface 29 of gear 28 or be permitted to slide outwardly to withdraw cone 36 from engagement with friction surface 29. If desired, a spring $28^a$ may be interposed between friction gear members 28 and 36 to effect their positive movement apart when lever 40 is in released position. On shaft 30 is also provided a crank arm or lug 42 for a purpose hereinafter described. The free end of lever 40 is provided with a hollow grip or handle 43 and a spring-projected latch member 44, the latter being adapted for engagement with a coacting fixed latch projection 45 on the apron 18. A plunger rod 46 is mounted for sliding movement transversely of the apron 18 and has an outer end portion 47 movable through the latch member 45 to engage, push-back and release latch member 44. Said rod 46 is normally held retracted by spring 48 and has a beveled inner end portion 49 for engagement with an automatic trip device as hereinafter described. Figures 3 and 5 show the control lever 40 in raised position and latched, in which position the high points of the cam surfaces 41 are engaged, whereby sleeve 38 is forced inward, thus throwing the friction clutch member 36 into engagement with friction clutch surface 29 and fixing gear member 28 to the shaft 30. As a result, a friction drive connection will be provided for driving the carriages 13 and 14 from the shaft 6 through the gearing just described and the pinion 19 and rack 20, giving a desirable fast power-drive carriage-feed motion for a bolt turning action not requiring a positive and accurate feed motion at a precise regulated speed. When the latch 44 is released, the lever 40 drops by gravity, allowing sleeve 38 to move outwardly, whereby the friction cone 36 is disengaged from friction surface 29 of gear member 28. This is the normal position of the aforesaid parts at all times except during a bolt turning action, and in such position of the parts gear member 28 turns idly on shaft 30. Gear 33, however, at all times remains in mesh with gear 34 so that the operator may, by means of the hand-wheel 32 and the rack and pinion gearing, move the carriages back and forth for positioning adjustments, except when the friction-drive mechanism, above described, is set into action for a bolt turning operation, or the nut and lead-screw gearing, hereinafter described, is set into action for a bolt threading operation.

The nut and lead-screw gearing includes the lead-screw portion 21 of shaft 6 and a divided nut composed of a pair of nut sections 50 and 51. These nut sections are disposed respectively above and below the screw and are mounted for opening and closing movements in suitable guideways in the apron 18. For adjusting the nut sections into and out of engagement with the lead screw, a control lever 52 is provided, said lever being fixed to the outer end of a sleeve 53 journaled on a rock-shaft 54. Fixed to said sleeve 53 is a clutch disk 55 and fixed to said shaft 54 is a coacting clutch disk 56. These disks have a lost-motion clutch connection in the form of pins or studs 57 on disk 56 engaging slots or recesses 58 in disk 55, the side walls of said slots providing abutment surfaces 59 and 60 for cooperation with said pins. Disk 56 also serves as a crank member to which are pivotally connected, on opposite sides of shaft 54, the arcuately curved ends 61 of links 62, the opposite ends of which links are straight and pivotally connected with the respective nut sections 50 and 51. Projecting from disk 56 is a lug 63 adapted for cooperation with a striker-pin or plunger 64 slidably mounted in the apron 18. At its upper end this pin 64 is provided with a head 65 adapted to seat within a socket or recess 66 (see Figure 6) formed in a part of the apron frame, the bottom wall of which recess serves as a stop to arrest the downward movement of the pin and to support said pin when in lowered position. Pivotally mounted at the top of the apron is a hammer 67 having at one end a striker head 68 and at its other end a beveled latch lip 69. A suitably mounted spring 70 is provided to impel the head end 68 of the hammer 67 downward to impart a blow to the headed end 65 of pin 64, and this spring is arranged so as to be tensioned for action when the end 68 thereof is elevated. The elevation of end 68 of the hammer sets said hammer for action, and the hammer is adapted to be held in such set position by a pivoted bell-crank latch 71, having at one end a beveled latch lip 72 to engage the latch lip 69 and having at its opposite end a trip arm 73. A spring 74, of suitable type, is provided to be tensioned by movement of the latch 71 to engaging position for the purpose of holding the same in such position. Spring 74 also acts, when the latch is released, to return to normal position a sliding latch-releasing bar 75. One end of this bar 75 engages the trip arm 73 and the other end of said bar is beveled, as at 76, for cooperation with an automatic trip device hereinafter described.

The nut sections 50 and 51, which are normally open or spread, are designed to be moved into engagement with the lead-screw 21 for the purpose of driving the carriage and threading tools from shaft 6 at a positive and regulated rate of speed for a threading action, the screw 21 accurately regulating the threading speed according to the desired thread pitch in order to secure the production of accurate and perfect threads. The nut-sections are moved into working position by manual upward movement of handle 52 from its normal released position $a^3$ (see Figure 14) to a fully-thrown upward setting position $a^4$. In such movement of handle 52 disk 55 is turned to the left (see Figure 14$^a$) and the rear walls 59 of slots 58 engage pins 57 and carry disk 56 around with disk 55. Disk 56 will thus be turned something more than a full quarter-revolution, thereby drawing on the links 62 to close the nut sections 50 and 51 about the lead screw 21. This movement is sufficient to cause the pivot points of the curved ends 61 of links 62 to pass on opposite sides of shaft 54 beyond the vertical dead-center line, effecting a self-locking action of the links, whereby the nut sections will be held closed and locked. In such turning movement of disk 56 the lug 63 is brought into engagement with striker-pin 64, thereby lifting said pin so that its headed end 65 engages and raises the headed end 68 of the hammer 67, thus tilting said hammer and tensioning its spring 70 and causing lip 69 to ride under the lip 72 of the latch 71, whereby the latch spring 74 is tensioned and the latch set to hold hammer 67 in position for subsequent release to strike pin 64 a hammer blow. This operation of the parts of the nut and hammer setting mechanism brings such parts to the position shown in Figure 14$^a$. When the handle 52 is then released by the operator the disk 56 remains in the locked position shown in Figure 14$^a$, but the handle 52 is free to drop by gravity to the intermediate partly retracted position $a^5$ shown in Figure 14$^b$, giving disk 55 a partial backward movement, such partial return movements of parts 52 and 55 being permitted to the extent of the width of slots 58, as a result of which slot walls 60 will be shifted into engagement with pins 57. This partial return movement of handle 52 and disk 55 provides for a lost-motion connection between disks 55 and 56 in the nut-releasing action, which occurs at the end of a threading operation when the latch 71 is retracted and releases the hammer 67. On the release of said hammer 67 it strikes pin 64 a sharp blow, the force of which is transmitted through lug 63 to disk 56, such force being sufficient to quickly turn disk 56 back to normal position against the locking resistance of the link ends 61, thereby instantaneously opening the nut sections 50 and 51 and stopping the carriage feed. In such backward movement of disk 56, it has a degree of preliminary travel independent of disk 55, in which pins 57 travel across the slots 58 from contact with slot walls 59 to contact with slot walls 60. The major portion of the force of the hammer blow is expended to unlock and retract the nut sections during this lost-motion period of disk 55. By this means the transmission of any violent backward motion to handle 52 is avoided, and liability of injury to the operator therefrom prevented. It will be understood that as soon as the nut unlocking action is completed, the handle 52 will be free to drop by gravity to normal position, carrying with it both disks 55 and 56. In order to avoid any possibility of the nut and lead screw gearing being thrown into action while the elements of the friction drive gearing are coupled up for a carriage drive action, I provide a safety device acting under such conditions to hold the nut sections against closing movement. This safety device (see Figure 15$^a$) comprises a sliding rod or bar 77 movable in guides 77$^a$ on the apron and having one end pivotally or otherwise suitably coupled to the crank arm or lug 42 and its other end carrying a finger 78, said rod and finger being normally held retracted by a spring 79. At all times when the friction cone 36 is retracted finger 78 is held out of the path of movement of nut sections 50 and 51. When, however, lever 40 is turned to throw friction cone 36 into action lug 42 slides rod 77 toward the nut sections 50 and 51 against the resistance of spring 79, thereby forcing finger 78 into the space between the nut sections 50 and 51, preventing said nut sections from being closed about lead screw 21. When lever 40 is turned up into position to throw cone 36 into action crank arm 42 in moving finger 78 forward compresses spring 79, which by a subsequent expansion assists lever 40, on its return by gravity to normal position, in turning shaft 30 backward to avoid any liability of sticking of the parts and to secure a quick clutch releasing action.

The cutting tools 15 and 16 are designed for either turning or threading the opposite ends 80 and 80′ of a stay-bolt blank 81. The machine may be employed for turning or threading the ends of different styles of boiler stay-bolts, but in the present instance, for purposes of exemplification, I have disclosed its method of use in turning or threading the ends of a so-called "button-head taper stay-bolt", in which the bolt body 82 (see Figure 21) is suitably reduced to allow a suitable amplitude of flexibility. As shown, the end portion 80 of this blank is straight or of uniform diameter and of twice the length of the end portion 80′, which latter is tapered and terminates in a button-head extremity 83 and a stub or projection 84. This stub or projection 84 is provided to fit within the spindle-chuck 10, so as to enable the bolt-blank to be gripped and rotated thereby. In the present instance, also, I have shown the cutter-heads 15 and 16 as equipped for threading instead of turning, the only difference involved being the use of threading cutters instead of turning cutters, which are interchangeable for use upon the same cutter-heads 15 and 16.

In the main the two cutter-heads 15 and 16 are alike in construction, differing only in certain particulars hereinafter noted. As illustrated in detail in Figures 17, 18 and 19, showing the rear cutter 16, said cutter comprises a body or head 85 having a suitable shank 86 for attachment to a bracket fastened to the carriage 13 or 14, as the case may be, said body and shank being provided with an axial bore 87 to receive an end of the bolt-blank and allow the cutter-head to travel therealong. The body 85 is provided with suitable guideways for radially movable and adjustable cutters comprising chaser-dies 88, said dies being carried by sliding die-carrier blocks 89 adapted to be moved outwardly, to wit, retracted, by springs 90. Rotatably mounted on the body is a cam die closing ring 91 provided with a closing handle or arm 92. This cam ring is formed with recesses 93 into which the outer ends of the blocks 89 may recede in the opening movement of the dies, and the walls of said recesses 93 and the outer ends of the blocks 89 are respectively provided with cam surfaces 94 and 95, whereby, through a prescribed rotary movement of the ring 91, the dies may be moved inward to threading position. Springs 96 are provided to move the ring 91 to die opening position, which springs are tensioned when the ring is turned to die closing position for subsequent reaction to shift the ring to die opening position. On the cam ring is a locking member 97 adapted for engagement with a spring-projected locking bolt 98 on the head 85, whereby the cam ring is locked against die-opening movement when it is turned to die closing position. The locking member 97 may, in practice, be made adjustable on the cam ring by means of micrometer screws 97' so that the locking point may be varied as occasion may require to compensate for wear or to change the extent of closing motion of the dies for various purposes. The bolt 98 is coupled to a pivoted trip-arm 99 whereby it may be retracted to release the cam-ring for an automatic die-opening movement. The above-description, as stated, applies particularly to the die-head or cutter 16, but the die-head or cutter 15 corresponds in construction thereto except, in the case of said die-head 15, of the omission of the locking elements 98 and 99 and the use of part 97 solely as an abutment for one of the springs 96 instead of its use as a locking element employed on die-head 16. The dies employed in the two cutter-heads 15 and 16 are of wide-opening type, being adapted to open sufficiently wide to permit endwise movement of the completed bolt in the bores 87 for the convenient removal of said bolt, and in the case of the die 15, to allow the bolt-blank to be extended therethrough and the button-head portion to pass the open dies without interference.

Suitable devices are provided for closing and automatically controlling the opening movements of the dies. The closing devices comprise cam members 100 and 101 on the headstock and tailstock, respectively, each having a rear horizontal surface 102 and a forward inclined surface 103, said surfaces being arranged for coaction with the cam controller arm 92 of the cooperating cutter-head. When the die-heads 15 and 16 are retracted from an advanced position, the arms 92 ride upward on the inclined surfaces 103, whereby the cam rings are turned to close the dies, and then said arms travel and rest on surfaces 102, whereby the cam rings and dies are held in closed position. On a forward feed motion of the carriages, the dies are held closed against any possibility of opening movement as long as the arms 92 travel on surfaces 102, since such surfaces 102 positively prevent any degree of die-opening movement of the cam rings 91 under the action of their retracting springs. Upon the passage of arms 92 onto surfaces 103, however, the dies are free to move to open position subject, in the case of the die 15, to the action of special means for regulating its opening movement during its threading period, and, in the case of the die 16, to the action of means for releasing the locking bolt 98 for a quick-die opening movement at the end of its threading period. In this connection I will first describe the means for controlling the bolt trip 99 of die 16, and then describe the means for controlling the opening movement of die 15.

The means for controlling the bolt trip 99 comprises a threaded rod 104 extending between bracket members 105 and 106 respectively arranged on the headstock 2 and on the carriage 14. The end of the rod 104 supported by bracket 105 may be inadjustably fastened thereto, but the end of the rod supported by the bracket 106, to which die-head 16 is suitably fastened, as by bolts 107, is slidably connected therewith. To this end, (see Figure 3ª) bracket 106 is provided with an eye 108 through which loosely passes a threaded sleeve 109 adjustable on the rear threaded portion of the rod 104. Said sleeve 109 forms a surface on which the eye 108 may reciprocate in the normal movements of the die-head 16 when moved forward in its working operation and retracted or returned to starting position. The sleeve 109 may be adjusted backward or forward on the rod 104, for cooperation with the eye 108, in setting the die-head 16 at different working distances from and relative to the die-head 15. On the rod 104 is also arranged a threaded trip collar 110 which lies in the path of movement of the bolt trip arm 99. This collar is adjustable on the rod to different working positions and is adapted to be secured in adjusted position by a jamb nut 111. The bracket 106 forms a direct support for the die-head 16 on the carriage 14, and is provided with an opening 112 alining with the axial opening of the die-head, through which opening 112 the bolt-blanks to be fed in position to be treated may be introduced, and through which opening also the finished bolt-blanks may be withdrawn. As shown, the carriage 14 is provided with guide members 113 engaging guideways 113' on the carriage 13. An adjusting means comprising a nut 114 on the carriage 14, engaged by a rotary threaded rod 114ᵃ on the carriage 13, said rod 114ᵃ being operable by a crank handle 114ᵇ, adapts the carriage 14 to be adjusted back or forth on carriage 13 so that the distance between die-heads 15 and 16 may be varied to adapt the machine for operation on bolt-blanks of different lengths. When this is done the parts 109, 110 and 111, as well as cam 101, should be adjusted as required for proper action under these changed conditions. The said adjusting means 114—114ᵃ also provides for any slight back and forth adjustment of the parts that may be necessary to take up looseness and compensate for wear. Such adjustments further provide for an accurate setting of the parts for a tripping engagement between the arm 99 and collar 110 at the proper moment.

The means for controlling the opening movement of the die 15 comprises a contact block 115 on the closing cam ring of said die, which block is engageable with the guide surface 116 of a laterally projecting arm or plate 117 on a controller member 118. This member 118 extends on a line parallel with the path of travel of carriages 15 and 16, and the surface 116 extends on a line forwardly and laterally inclined to said path in the direction of die opening movement of the cam ring. In the forward movement of die 15, block 115 engages the rear of surface 116 before or at the moment the arm 92 of the cam ring passes beyond the forward end of surface 102 of the cam 100, so that as soon as the cam 92 leaves said surface 102, and the die is free to open, its opening action will be controlled by the movement of block 115 along the guide surface 116. Controller 118 consists of a body 118ᵃ having in its underside a guideway 118ᵇ receiving a support 119 on which it is slidably mounted, said support being secured by two screws 120 and 121 to the die body. One of these screws is longer than the other and forms an abutment for the rear end of a coiled expansion spring 122, bearing at its forward end against a suitable abutment surface 123 on the controller body. This spring moves the controller 118 forward to a normal predetermined working position to an extent limited by a stop pin or bolt 124 and allows the controller to have, under pressure, a rearward or receding movement which is resisted by the compression of said spring. The pin 124 is adapted to abut at its lower end against the support 119 and is provided with a fixed clamping collar 125 bearing against the upper wall of the guideway 118ᵇ. As shown, the upper end of the pin projects upward through a slot 126 in the top of the controller and carries a clamping collar 127 and a nut 128, whereby the pin is adjustably mounted to set the controller backward or forward to adjust the arm 117 with relation to the contact block 115. The engaging faces of the collar 127 and body of the controller may be milled or serrated, as shown, so as to lock the pin fastening securely in adjusted position. The forward end of the controller body is adapted to abut against a stop 129 on the headstock whereby its action is governed from the time the cutter 15 begins its cutting action on the end 80' of the stay-bolt blank 81. The stop 129, as shown, comprises a headed bolt in adjustable threaded engagement with the headstock and associated with a nut 130 to secure it in adjusted position. The construction of the die opening controlling means for the die 15, above described, premises the use of the machine for cutting a tapered end portion 80' of a bolt. By the simple substitution, however, for the die 15 and the described means for regulating its spring movement, of a die like the die 16 and a second contact member 110, used in conjunction with cam 100, both cutters may be operated to work alike so that bolts having both end portions straight and of like diameter, whether of the same or different lengths, may be turned or threaded. For this purpose and general purposes of adjustment, to compensate for wear and secure exactness of operation, each cam member 100 and 101 may be slidably fitted for adjustment in a guideway 131 and one or more nuts 132 provided to secure the same in adjusted position. Adjustment of cam member 101 in its guideway also adapts it to be set forward or backward any required distance for proper action when die-head 16 is disposed at different distances from die-head 15 to adapt the machine for action on different lengths of bolt-banks.

As before described, cutter 15 is adjustable with relation to cutter 16 to properly space said cutters for operation upon different lengths of bolt-blanks. In order to enable this adjustment to be made with great accuracy, the gauge bar 17 is provided which is adjustably connected with the carriage 14. To this end said carriage 14 is provided with a sleeve or eye 133 slidably engaging bar 17, said sleeve or eye being apertured for passage of a coupling and gauge pin 134 adapted to be passed also through any one of a series of gauge openings 135 in the bar. These openings 135 are accurately spaced from center to center distances apart to space the cutters proper distances apart to operate upon the ends of bolts of given lengths, within any given range, while at the same time maintaining a relative arrangement of the cutters to preserve the lead of the thread in threading operations. This is an important feature of my invention, as it enables accurate threads of the same lead to be simultaneously formed on the ends of a stay-bolt of any length and in which the ends are of any distance apart between their inner extremities and of the same or different relative lengths. Such cutter adjustment, combined with a nut and lead screw feed action for threading, further ensures the production of perfectly threaded stay-bolts in a very rapid and economical manner.

Secured to a fixed portion of the main frame is a relatively stationary stop member 136 suitably adjustable on frame 1, as hereinafter described. Provided on the carriage 14 for cooperation with this member 136 is a trip device 137 for throwing either power-drive mechanism out of action at the end of a carriage feed movement to arrest the feed motion of the carriages. Said trip device consists of a longitudinally movable rod carrying beveled or conical contacts 138 and 139 to respectively engage the beveled ends 49 and 76 of the trip members 46 and 75. The forward end of the rod is arranged to come in contact with the stop member 136 as the carriages approach the limit of their working movement, forcing the rod 137 backward against the resistance of a spring 140. This spring cushions the backward movement of the trip rod and thereafter returns it to normal working position. On the backward motion of the trip rod, contacts 138 and 139 engage and actuate the trip members 46 and 75 to throw the adjustable friction cone of the friction drive turning feed mechanism or the nut of the threading feed mechanism, as the case may be, out of action to arrest the operation of the working feed mechanism. Rod 137 has a threaded engagement, as indicated at 137′, with a follower sleeve 141 carrying the contact 139 and on which spring 140 acts and a suitable end portion 142 whereby a screw-driver or other tool may be applied for turning said rod, whereby it may be adjusted with relation to stop 136 to secure an accurate trip action. When both power drive mechanisms are out of action it will, of course, be understood that the carriage may be manually moved back or forth in a rapid manner for positioning actions by operation of the hand-wheel 32 and rack-and-pinion gearing.

A steady-rest 143 is formed or provided on the stop 136, which latter may be positioned on the main frame at any point between carriages 13 and 14 for coaction with trip rod 137. The steady-rest 143 is designed to support the bolt-blank while being acted upon and while the cutter 16 is being moved up to engage the bolt end 80, the use of which steady-rest is particularly desirable in turning or threading long bolts. As shown, the stop 136 is provided with guide members adjustable in guideways 113′ and is adapted to be fastened in adjusted position by bolts or screws 143′, whereby it may be set and held in any position as required for cooperation with the rod 137.

While the die-head 15 is not normally intended to be adjusted with relation to the die-head 16, except through the described adjustments of the latter, provision may be made for its adjustment to compensate for wear of parts or to secure absolute working accuracy. To this end, the die-head 15 may be fastened to a bracket 144 having guide members 145 adjustable in the guideways 113′ and adapted to be fastened in adjusted position by bolts or screws 146. This bracket may be adjustably fastened to the front end of the gauge bar, as indicated at 147. The bracket is provided with an opening 148 in alignment with the axial bore of die-head 15, thereby allowing of the passage of the forward ends of the bolt-blanks into said bore, as will be readily understood.

The operation of the machine constructed as above described is as follows:

Figure 21 shows the position of the parts when both carriages 13 and 14 are retracted and the arms 92 of the cam rings 91 of the cutter-heads 15 and 16 are engaged with surfaces 102 of the cams 100 and 101, the cutters of both cutter-heads being closed and in working position. Cutter-head 16 is also shown in position to start work on the longer rear end portion 80 of the bolt-blank 81. This end portion 80 is, as stated, in the type of bolt-blank shown, of a length double the length of the end portion 80′. Hence the two carriages 13 and 14 are so spaced at the moment the cutter 16 is in position to start work at the outer extremity of end portion 80 that the cutter 15 lies a distance in rear of the inner extremity of end portion equal to the full length of the tapered surface of end portion 80′, or one-half the length of end portion 80. Hence when the carriages are started on their feed motion the cutter 16, as shown in Figure 22, will be in active operation turning or threading, as the case may be, the outer half of the end portion 80 while the cutter 15 is idle and moving up to working position. During this preliminary working period of cutter 16 and idle feed period of cutter 15 arms 92 of cam rings 91 travel along surfaces 102 of cams 100 and 101 and off said surfaces 102 onto the surfaces 103 of said cams 100 and 101. The cam rings 91 are thereby released from the closing surfaces of the closing cams 100 and 101 and would be free to open, but for the fact that the ring 91 of cutter 16 is still held closed by the latch bolt 98, while ring 91 of cutter 15 is held closed by the engagement of contact 115 with the rear portion of the cam surface 116 of the controller member 118, which is held by its spring 122 in a forwardly projected position. The cutter 15 is now in position to begin its cut on bolt end 80', at which instant the forward end of controller 118 engages the stop 129 which holds said controller 118 from further movement with and during the working travel of cutter 15. On the second half of its working movement on the bolt end 80, the cutter 15 completes its work of turning or threading such end 80 the full distance, at the end of which trip arm 99 is engaged and actuated by trip collar 110 to retract bolt 98, whereupon the cam ring 91 of cutter 16 is turned by its actuating springs to retract the associated cutting members and to spread the same to their full or wide open position. While cutter 16 has been engaged on the second half of its working movement, as above described, cutter 15 is acting upon the tapered bolt portion 80'. In its travel along said bolt portion 80' the cutting members 88 of cutter 15 are permitted to be gradually forced open, proportionately to the degree of taper, under the action of the retracting springs of its cam ring 91, thus turning or threading such surface in conformity with its taper. This operation is effected as a result of the travel of the contact 115 along the receding cam surface 116 of the arm 117 of controller 118, which is held from forward movement by the stop 129 and pushed backward, as the carriage 15 advances, against the resistance of its spring 122. Such backward movement of controller 118 allows the contact 115 to travel on the surface 116 in the direction of opening movement of the cam ring 91, for a graduated and progressive opening movement of said cam ring until it passes beyond the forward end of the surface 116, which occurs at the moment the cutters reach the limit of their travel adjacent to the inner face of button-head 83, whereupon the cutting elements of the cutter 15 will be opened full-wide and the cutting action ceases. It will be understood, of course, that as the cutters of the cutter-head open the contact rod 137 engages the stop member 136 and is thereby actuated to throw the power drive gearing which is in use out of operation. The completed bolt may then be released from the chuck and moved backward through the wide open cutters and withdrawn through the rear cutter 16 in a manner readily understood. The carriages 13 and 14 are then moved back to starting position by means of the handwheel 32 and rack-and-pinion gearing 19—20, which provides for a quick return motion. On the return of the carriages to starting position, the various control and trip elements will be automatically returned to normal position and the cam ring control arms will ride over the inclined surfaces 103 of cams 100 and 101 and rest on the surfaces 102, thereby closing the cutters for the next work action, the cam ring of cutter 16 being locked in cutter-closing position, as previously described, by the locking action of the bolt 98. Previously to the reversal of the carriages the succeeding new bolt blank to be treated is slipped from the rear longitudinally through both dies and its portion 84 engaged with and gripped by the chuck, whereupon, on the reversal of the carriages, the machine will be set for the next operation.

The advantages resulting from my new and improved machine are as follows: First, the number of steps or working motions required to turn or thread a bolt-blank are considerably reduced, thus simplifying the method of manufacture, reducing the number of working parts of the machine, and reducing time and labor while enabling production to be greatly increased; secondly, a novel and simplified type of gearing is provided for driving the machine at a fast feed for turning and a relatively slower feed for threading, both from the same drive shaft, without the use of complex gearing; thirdly, the threading feed mechanism employed provides a positive and uniform feed motion ensuring the production of perfect threads, with the leads of both end portions of the bolt in accurate lead; the gauging adjustment for spacing the tool carriages any accurate distance apart adapts the machine to be easily and quickly set to act upon bolt-blanks of any given length while preserving the thread lead; fourthly, the machine is adapted for threading plain taper or button-head taper stay-bolts and, with slight changes in arrangement or adjustment of parts, may be employed for turning or threading other specifically different forms of stay-bolts; and, finally, a reliable and efficient type of machine is produced which enables finished bolts of the character described to be produced in a rapid manner and at a comparatively low cost.

In certain of the appended claims I have, for convenience, employed the term "die-heads" as indicative of holders for cutting tools, and cutting tools held thereby, and it is to be understood that such terms are to be respectively considered as applying, broadly, to any types of holders and cutting tools carried thereby, whether for turning, threading or other similar work, except where the subject-matter covered by a claim relates particularly and specifically to a threading operation.

Having thus fully described my invention, I claim:—

1. In a power driven machine for finishing the ends of bolt-blanks, the combination of means for holding and rotating a bolt-blank in a horizontal plane, cutters for operation respectively upon the ends of the bolt-blank, power driven mechanism including a lead screw for feeding said cutters in unison longitudinally of the bolt-blank while the latter is being rotated, means for causing said cutters to act upon the ends of the bolt-blank, means for throwing said cutters out of action at the end of the cutting operation, and means for throwing the power driven feeding mechanism out of action upon the cessation of cutting action of the cutters.

2. In a power-driven machine for finishing the ends of bolt-blanks, the combination of means for holding and rotating a bolt-blank in a horizontal plane, cutters for operating respectively upon the ends of the bolt-blank, said cutters being movable in a horizontal plane longitudinally of the blank, means for throwing the cutters into action, means for throwing the cutters out of action, and power-driven means for feeding the cutters, said means being operative to drive the cutters at a constant predetermined speed corresponding accurately to a determined thread lead.

3. In a power-driven machine for finishing the ends of bolt-blanks, the combination of means for holding and rotating a bolt-blank in a horizontal plane, a pair of spaced cutters movable in a horizontal plane along the bolt-blank for finishing the ends thereof, means for throwing the cutters into action and throwing them out of action at proper time periods, and power-driven mechanism for feeding the cutters, said mechanism including a gear nut and a lead screw.

4. In a power-driven machine for finishing the ends of bolt-blanks, the combination of means for holding and rotating a bolt-blank in a horizontal plane, a pair of spaced cutters movable in a horizontal plane longitudinally along the bolt-blank for finishing the respective ends thereof, means for throwing the cutters into action and throwing them out of action at proper time periods, power-driven mechanism for feeding the cutters including a gear nut and a lead screw, and means for bringing the gear nut and lead screw into and out of operative engagement.

5. In a machine for finishing the ends of bolt-blanks, the combination of means for holding and rotating a bolt-blank, a pair of die-heads movable along the bolt-blank, a bar provided with spaced index openings fixedly connected with one die-head and slidably connected with the other die-head, means on the other die-head engageable with any of said openings to set the die-heads at different distances apart while maintaining the cutting lead of the dies thereof, means for feeding the die-heads along the bolt-blank, and means for controlling the action of the dies thereof.

6. In a machine for threading the ends of bolt-blanks, the combination of means for holding and rotating a bolt-blank, front and rear self-opening dies for acting upon the respective ends of the blank, said dies being movable forwardly in unison along said blank for threading actions on the ends thereof, means operative on the backward movement of the dies to starting position for closing the same for action, a locking device for locking the rear die in closed position, a trip device for releasing said rear die for opening movement at the end of its threading traverse an abutment on the front die, a slidable device upon the front die having a surface inclined to its path of travel for sliding engagement with said abutment to permit opening movement of the front die, and a controller operative in the threading travel of said front die to shift said slidable device out of the path of movement of said abutment.

7. In a machine for finishing the ends of bolt-blanks, the combination of means for holding and rotating a bolt-blank, front and rear dies movable along said blank for action upon the respective ends thereof, controlling means for setting and retracting the rear die, a rotatable spring retracted cam ring on the front die movable to open and close the same, said ring having a contact thereon, means for turning said ring to die closing position, a sliding spring projected controller on said die having a cam surface for engagement with said contact, and a stop arranged in the path of movement of said controller for sliding the same rearwardly against the resistance of its spring in the forward travel of said die so as to gradually move said cam surface along and finally out of engagement with said contact.

8. In a machine for finishing the ends of stay-bolts, the combination of a frame, a carriage mounted to travel upon said frame, a drive shaft having a threaded portion forming a lead screw, means for holding and rotating a bolt-blank, dies arranged in spaced relation upon the carriage for operating upon the ends of the bolt-blank, means for automatically opening and closing said dies, a drive gear mounted upon the carriage and splined to the drive shaft to rotate therewith and slide thereon with said carriage, gearing for imparting forward motion to the carriage including a nut, and means for throwing said nut into and out of operative engagement with the lead screw.

9. In a machine for finishing the ends of stay-bolts, the combination of a frame, means for holding and rotating a bolt-blank, a carriage movable on said frame, dies mounted on the carriage for acting upon the respective ends of the bolt-blank, a drive shaft having a threaded portion forming a lead screw, a drive gear mounted on the carriage for movement therewith and splined to the shaft to slide thereon and rotate therewith, means including a rack and pinion for retracting the carriage, a fast feed gearing for coupling the drive gear with the rack and pinion mechanism for a fast carriage feed motion, means for throwing said gearing into and out of action, a nut movable into and out of engagement with the lead screw for imparting a relatively slower feed motion to the carriage, and means for shifting said nut into and out of engagement with the lead screw.

10. In a machine for finishing the ends of bolt-blanks, the combination of a frame, means for holding and rotating a bolt-blank, a carriage mounted for backward and forward movement on the said frame, a drive shaft having a threaded portion forming a lead screw, dies mounted on the carriage for action upon the respective ends of the bolts, means for manually reversing the carriage including a rack and pinion gearing, a drive gear mounted on and movable with the carriage and splined to the drive shaft to slide thereon and rotate therewith, gearing for driving the carriage at fast speed from the drive shaft through said rack and pinion gear, a clutch device for throwing said gearing into and out of action, a nut on the carriage adjustable into and out of operative connection with the lead screw, and means for adjusting said nut.

11. In a machine for finishing the ends of stay-bolts, the combination of a frame, means for holding and rotating a bolt-blank, a carriage movable backward and forward on the frame, dies mounted on said carriage for acting upon the respective ends of the bolt-blank, a drive shaft having a threaded portion forming a lead screw, means including rack and pinion mechanism for manually retracting the carriage, a drive gear mounted on the carriage for movement therewith and splined to the drive shaft for rotation therewith and sliding motion therealong, normally inactive gearing for coupling said drive gear to the rack and pinion gearing for moving the carriage forward at fast speed, a clutch device for throwing said gearing into and out of action, a nut upon the carriage formed of relatively movable sections engageable with and disengageable from the lead screw for imparting slow speed motion to the carriage, a device operative with the fast speed gearing for preventing engaging adjustment of the nut with the lead screw when said fast speed gearing is in action, and means for throwing the fast speed gearing for the nut and lead screw gearing out of action at the limit of feed motion of the carriage.

12. In a machine for finishing the ends of stay-bolts, the combination of a frame, means for holding and rotating a bolt-blank, a carriage movable backward and forward on the frame, dies supported upon the carriage for action upon the respective ends of the bolt-blank, a drive shaft having a threaded portion forming a lead screw, manually operable means including a rack and pinion for retracting the carriage, a drive gear mounted on the carriage for movement therewith and splined to the shaft for sliding motion thereon and rotation therewith, a fast speed gearing for coupling said drive gear to the rack and pinion gearing, a control device for throwing said fast speed gearing into and out of operation, a nut engageable with and disengageable from the lead screw and forming a positive low speed gearing, a control device for throwing said low speed gearing into and out of action, a stop upon the frame, a tripping means including a single trip device engageable with said stop for throwing either said fast speed gearing or slow speed gearing out of action at the limit of forward travel of the carriage.

13. In a machine for finishing the ends of stay-bolts, the combination of a frame, means for holding and rotating a bolt-blank, a carriage movable backward and forward on the frame, dies mounted on the carriage for action on the respective ends of the bolt, means for adjusting one of said dies with relation to the other to vary the distance between them, a drive shaft having a threaded portion forming a lead screw, a drive gear mounted on the carriage for movement therewith and splined to the drive shaft for sliding motion thereon and rotative therewith, a manually operable carriage retracting and positioning gearing, fast speed mechanism for connecting said gearing with the drive gear, manually operable means for throwing the same into and out of action, a slow speed gearing including a nut for connecting the carriage with the lead screw, manually operable means for throwing said slow speed gearing into and out of action, means for automatically throwing either of said gearings when set for action at the end of feed motion of the carriage, and means for automatically controlling the dies in their working action on the bolt ends.

14. In a machine for finishing the ends of bolt-blanks, the combination of means for holding and rotating a bolt-blank, means movable longitudinally of the bolt-blank for finishing the ends thereof, a threaded drive shaft, a nut composed of sections movable into and out of engagement with said shaft, means for adjusting the nut sections and holding them in nut engaging position, an automatically locked knock-off device set and locked by the adjustment of said nut sections into engaging position for subsequent release for a nut retracting action, and means operative on a prescribed movement of said threading means for unlocking said knock-off device.

In testimony whereof I affix my signature.

ROBERT R. LASSITER.